(12) United States Patent
Ugru

(10) Patent No.: US 8,821,065 B2
(45) Date of Patent: Sep. 2, 2014

(54) ARCUATE SHIELDS FOR COMPACTOR WHEEL ASSEMBLY AND COMPACTOR USING SAME

(75) Inventor: Vinayak R. Ugru, Sugar Grove, IL (US)

(73) Assignee: Caterpillar Inc., Peoria, IL (US)

( * ) Notice: Subject to any disclaimer, the term of this patent is extended or adjusted under 35 U.S.C. 154(b) by 545 days.

(21) Appl. No.: 13/158,875

(22) Filed: Jun. 13, 2011

(65) Prior Publication Data

US 2012/0312567 A1 Dec. 13, 2012

(51) Int. Cl.
*E01C 19/26* (2006.01)
*A01B 29/06* (2006.01)
*B60B 15/24* (2006.01)
*E02D 3/026* (2006.01)

(52) U.S. Cl.
CPC ............... *E02D 3/026* (2013.01); *B60B 15/24* (2013.01)
USPC .......................................... 404/124; 172/537

(58) Field of Classification Search
USPC .......... 404/121, 122, 124; 172/534, 535, 537, 172/541
See application file for complete search history.

(56) References Cited

U.S. PATENT DOCUMENTS

| | | | | |
|---|---|---|---|---|
| 348,284 A | * | 8/1886 | Horton | 172/247 |
| 963,618 A | * | 7/1910 | Moore | 172/535 |
| 994,725 A | * | 6/1911 | Denson | 172/534 |
| 1,256,225 A | * | 2/1918 | Harland | 172/535 |
| 1,377,794 A | | 5/1921 | Aikin | |
| 1,378,025 A | | 5/1921 | Hans | |
| 1,560,295 A | * | 11/1925 | Keeler | 404/124 |
| 1,932,267 A | | 10/1933 | Francis | |
| 2,132,955 A | | 10/1938 | Johnson | |
| 2,410,465 A | * | 11/1946 | Small | 404/121 |
| 3,610,116 A | | 10/1971 | Viefhaus | |
| 4,020,906 A | * | 5/1977 | Wells | 172/350 |
| 4,632,599 A | | 12/1986 | Sadahiro | |
| 5,511,901 A | * | 4/1996 | Yates | 404/124 |
| 5,951,123 A | * | 9/1999 | Bomstad et al. | 305/107 |
| 6,390,204 B1 | | 5/2002 | Schafle | |
| 2007/0280783 A1 | * | 12/2007 | Gibbins | 404/124 |

* cited by examiner

*Primary Examiner* — Abigail A Risic

(57) ABSTRACT

A compactor wheel assembly includes a substantially cylindrical wheel surface having a plurality of compactor wheel tips extending radially therefrom. The wheel surface and the plurality of compactor wheel tips define an overall diameter. A plurality of arcuate shields are coupled with the wheel surface and define a substantially cylindrical wrapper around the wheel surface. The wrapper includes first and second bands. The first band has a diameter greater than the overall diameter and defines a substantially continuous surface for engaging the ground. The second band has a diameter less than the overall diameter and defines a substantially continuous surface for engaging the wheel surface.

20 Claims, 3 Drawing Sheets

ARCUATE SHIELDS FOR COMPACTOR WHEEL ASSEMBLY AND COMPACTOR USING SAME

TECHNICAL FIELD

The present disclosure relates generally to a plurality of arcuate shields for a compactor wheel assembly, and more particularly to arcuate shields that, when coupled with a wheel surface, provide a substantially continuous surface for engaging the ground and a substantially continuous surface for engaging the wheel surface.

BACKGROUND

A compactor is a type of machine that is commonly used to pack down and hence increase a load supporting capacity of materials, such as waste or soil. For example, a compactor may be used at a landfill to crush waste and refuse materials, or at a construction site to compact earth, including dirt and rock. Compactors typically have cylindrical wheels or rollers that are used to crush the waste or soil as the compactor is moved throughout the job site. In the case of soil or waste compactors, wheel tips, or teeth, may be supported about external surfaces of the wheels or rollers to improve compaction and/or traction capabilities of the ground engaging wheels or rollers of the compactor.

While surfaces of the compactor wheel tips, during normal operation of the compactor, are subject to wear, moving the compactor along paved or surfaced roads may subject the wheel tips to excessive wear and/or damage. Such excessive wear or damage may significantly decrease the life of the wheel tips and, possibly, the compactor wheel. Further, moving the compactor across relatively hard roads, such as to move the compactor between job sites, may expose the road to excessive wear and/or chipping. Some regulations may even prohibit the operation of compactors or other machines having compactor wheel tips across certain roadways to prevent potential road damage.

A tractor lug guard is provided in U.S. Pat. No. 1,932,267 to Francis. As taught in the Francis patent, a tractor lug guard may be attached to tractor wheels when operating the tractor on a highway. Specifically, four lug guard sections, having an overall thickness greater than a height of the tractor lugs, are provided in series to form an annulus about the tractor wheel. Each piece is bolted to the wheel and to an adjacent lug guard piece, and includes lug shaped recesses in the inner periphery thereof to reduce slippage of the guard pieces relative to the wheel. Facilitating attachment of the guards to the wheels, especially in the field, may be problematic.

The present disclosure is directed to one or more of the problems set forth above.

SUMMARY OF THE DISCLOSURE

In one aspect, a compactor wheel assembly includes a substantially cylindrical wheel surface having a plurality of compactor wheel tips extending radially therefrom. The wheel surface and the plurality of compactor wheel tips define an overall diameter. A plurality of arcuate shields are coupled with the wheel surface and define a substantially cylindrical wrapper around the wheel surface. The wrapper includes first and second bands. The first band has a diameter greater than the overall diameter and defines a substantially continuous surface for engaging the ground. The second band has a diameter less than the overall diameter and defines a substantially continuous surface for engaging the wheel surface.

In another aspect, a compactor includes a frame, an internal combustion engine supported on the frame, and a plurality of compactor wheel assemblies coupled through a drivetrain with the internal combustion engine. Each of the plurality of compactor wheel assemblies includes a substantially cylindrical wheel surface having a plurality of compactor wheel tips extending radially therefrom. The wheel surface and the plurality of compactor wheel tips define an overall diameter. A plurality of arcuate shields are coupled with the wheel surface and define a substantially cylindrical wrapper around the wheel surface. The wrapper includes a first band having a diameter greater than the overall diameter and defining a substantially continuous surface for engaging the ground, and a second band having a diameter less than the overall diameter and defining a substantially continuous surface for engaging the wheel surface.

In yet another aspect, a compactor wheel shield assembly includes a plurality of arcuate shields configured to be coupled with a substantially cylindrical wheel surface and to define a substantially cylindrical wrapper around the wheel surface. The wrapper includes first and second bands. The first band has a diameter greater than an overall diameter, which is defined by the wheel surface and a plurality of compactor wheel tips extending radially therefrom, and defines a substantially continuous surface for engaging the ground. The second band has a diameter less than the overall diameter and defines a substantially continuous surface for engaging the wheel surface.

DETAILED DESCRIPTION

Figure 1:
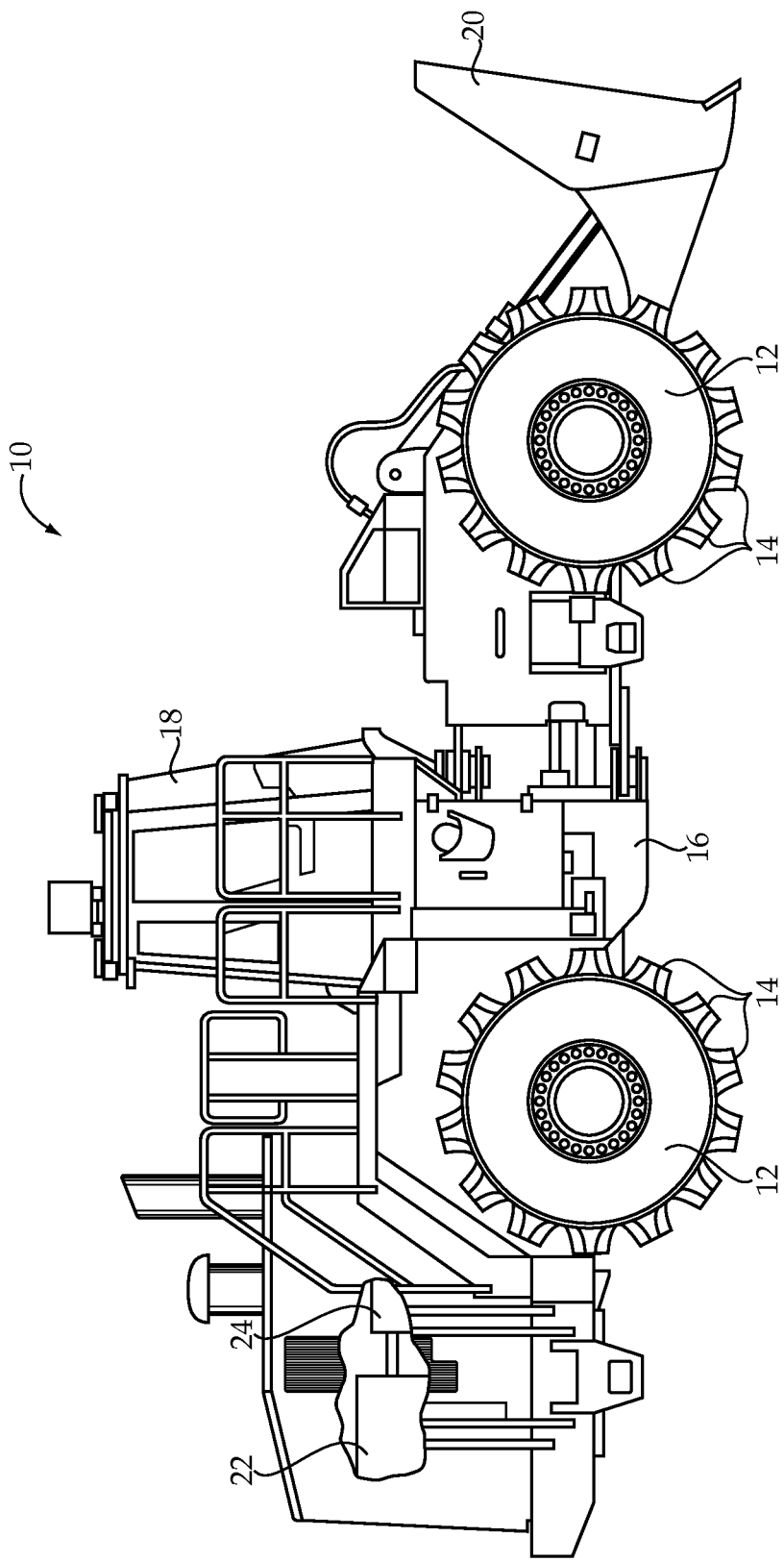
FIG. 1 is a side diagrammatic view of a compactor, according to the present disclosure.

An exemplary embodiment of a compactor 10 is shown generally in FIG. 1. The compactor 10 may be used at a job site, such as a landfill or a construction site, to compact materials, and may generally include compactor wheels 12, or other similar ground engaging elements, such as rollers, having wheel tips 14, or teeth. The compactor wheels 12, embodiments of which will be discussed later in greater detail, may be used to crush materials, such as, for example, waste or soil, as the compactor 10 is moved throughout the job site. The compactor 10 may also include a frame, or chassis, 16 for supporting the compactor wheels 12 and other well known components, such as an operator control station 18 and an implement 20, such as a bucket or blade. The compactor 10 may also include an internal combustion engine 22 supported on the frame 16, and a drivetrain 24 coupling the internal combustion engine 22 with the compactor wheels 12. The compactor 10 may also include a variety of mechanical, hydraulic and/or electrical systems for performing known functions. Such components and/or systems are well known to those skilled in the art and, therefore, will not be discussed herein in greater detail.

Figure 2:
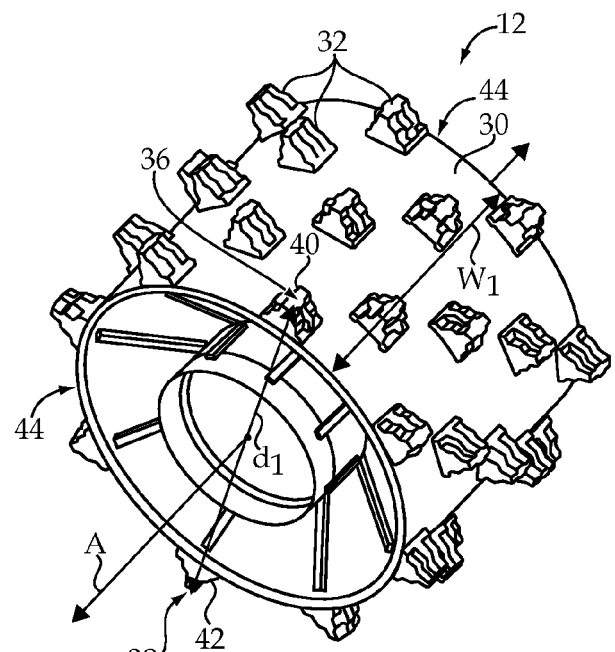
FIG. 2 is a perspective view of a compactor wheel assembly of the compactor of FIG. 1, according to one aspect of the present disclosure.

Turning now to FIG. 2, one of the compactor wheels 12 is shown in greater detail. The compactor wheel 12 may generally include a substantially cylindrical wheel surface 30, defining a wheel base or rim, having an axis of rotation A and including a plurality of circumferentially spaced compactor wheel tips 32 extending radially therefrom. The compactor wheel tips 32 may be provided in a pattern about the wheel surface 30 selected to provide desired compaction and/or traction capabilities of the compactor wheel 12. For example, as shown in the exemplary embodiment, the compactor wheel tips 32 may be provided in circumferential rows about the wheel surface 30. Further, the compactor wheel tips 32 may be staggered in an axial direction, relative to axis A, across a width $w_1$ of the wheel surface 30. The wheel surface 30 and the plurality of compactor wheel tips 32 define an overall diameter $d_1$, which, as should be appreciated, represents a diameter measured from distal tips 36 and 38 of diametrically opposed wheel tips 40 and 42, respectively.

Figure 3:
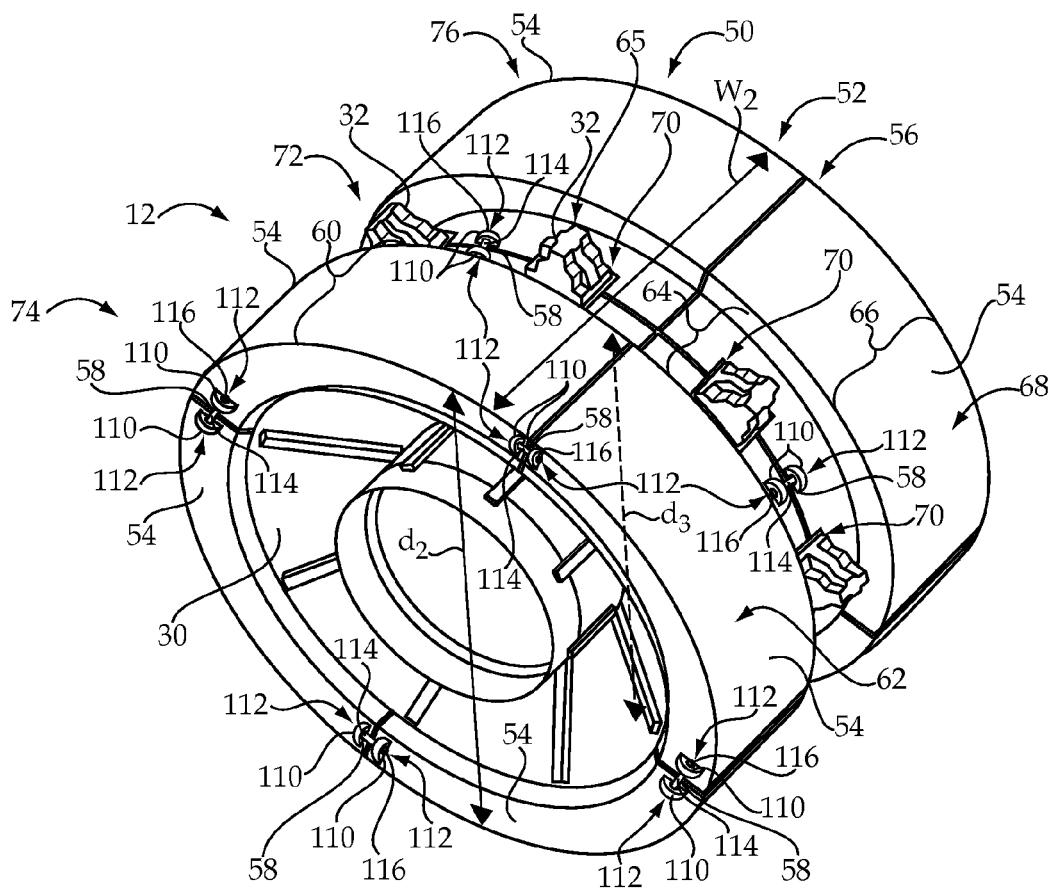
FIG. 3 is a perspective view of a plurality of arcuate shields shown coupled with a wheel surface, according to another aspect of the present disclosure.

Turning now to FIG. 3, a compactor wheel assembly 50, including the compactor wheel 12 having a roading protection system, or compactor wheel shield assembly, 52 installed thereon is shown. More specifically, the roading protection system 52 includes a plurality of arcuate shields 54, each made from a durable and wear resistant steel, shown coupled with the wheel surface 30. According to this coupled configuration, the arcuate shields 54 define a substantially cylindrical wrapper 56 around the wheel surface 30. Specifically, each arcuate shield 54 has an arcuate shape and, as such, represents a segment of a cylinder. The coupled configuration, shown in FIG. 3, may be secured using a plurality of fasteners 58, which will be discussed later in greater detail. Although specific fasteners 58 are shown and described, it should be appreciated that alternative fasteners may also provide the coupled configuration described herein.

Moving across a width $w_2$ of the wrapper 56, a first band 60 has a diameter $d_2$ greater than the overall diameter $d_1$ and defines a substantially continuous surface 62 for engaging the ground. A second band 64 has a diameter $d_3$ less than the overall diameter $d_1$ and defines a recessed area 65 and a substantially continuous surface (not shown) for engaging the wheel surface 30. Specifically, an inner surface of the second band 64, which will be shown and discussed later in greater detail, defines the substantially continuous surface for engaging the wheel surface 30. A third band 66 also has a diameter $d_2$ greater than the overall diameter $d_1$ and defines another substantially continuous surface 68 for engaging the ground. As shown, the first and third bands 60 and 66 are on opposing sides of the second band 64. The second band 64 includes openings 70 for receiving a subset of the plurality of compactor wheel tips 32 therethrough. Specifically, the openings 70 receive a center row 72 of the compactor wheel tips 32.

According to the exemplary embodiment, exactly eight arcuate shields 54 define the wrapper 56, and each of the arcuate shields 54 may be identical. It should be appreciated that, in the coupled configuration, four of the arcuate shields 54 may be positioned on an inboard side 74 of the compactor wheel 12, while the other four arcuate shields 54 are positioned on an outboard side 76 of the compactor wheel 12. As should be appreciated, the inboard side 74 may be closer to the frame 16 of the compactor 10 than the outboard side 76. Since, according to the exemplary embodiment, the arcuate shields 54 are identical, each arcuate shield 54 may be interchangeable with another arcuate shield 54. Although the disclosure shows exactly eight arcuate shields 54 defining the wrapper 56, other quantities, such as 10, that together defined a cylinder could also fall within the scope of this disclosure.

Figure 4:
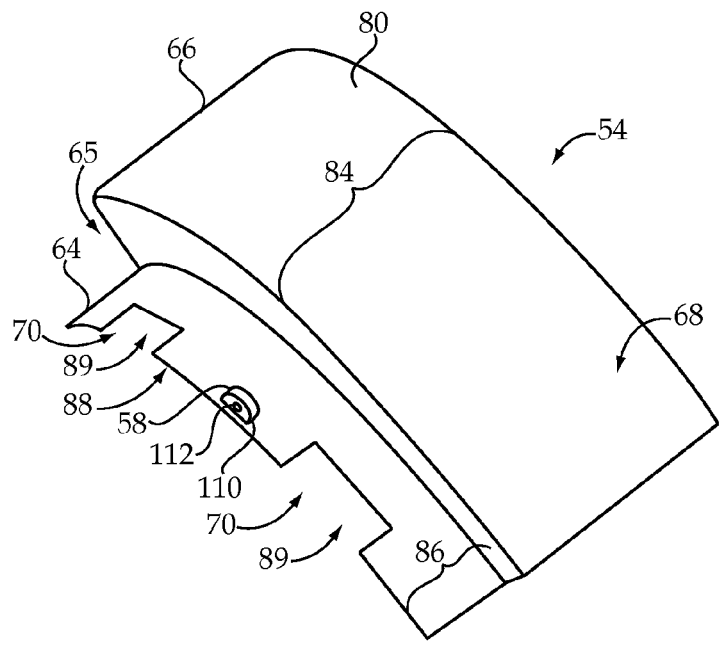
FIG. 4 is a perspective view of an outer surface of one of the arcuate shields of FIG. 3, according to another aspect of the present disclosure.
Figure 5:
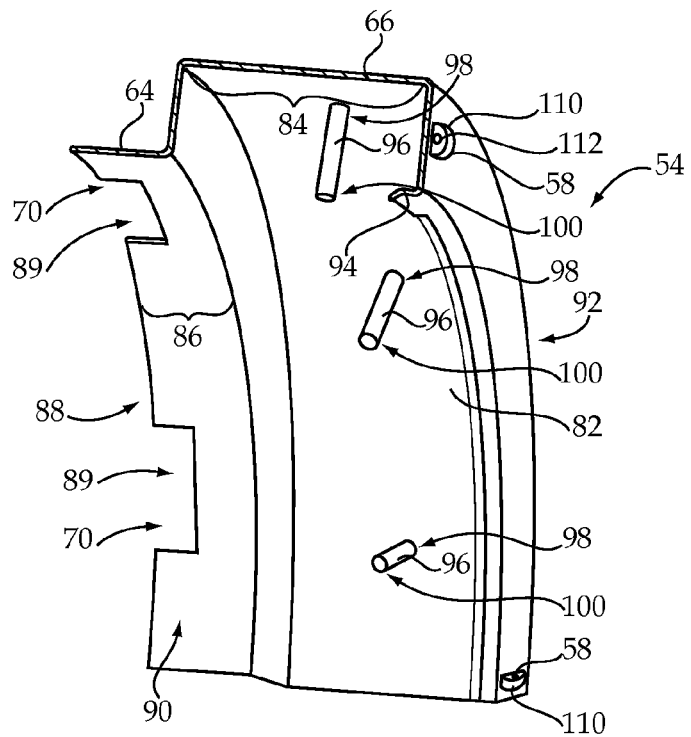
FIG. 5 is a perspective view of an inner surface of one of the arcuate shields of FIG. 3, according to another aspect of the present disclosure.

Turning now to FIGS. 4 and 5, one of the identical arcuate shields 54 will be discussed. Specifically, an outer surface 80 of the arcuate shield 54 is shown in FIG. 4, while an inner surface 82 of the arcuate shield 54 is shown in FIG. 5. Each of the arcuate shields 54 have a stepped profile, as shown, and include an outer section 84, which defines a portion of the first or third bands 60 or 66, and an inner section 86, which defines a portion of the second band 64. For exemplary purposes, the outer section 84 of FIGS. 4 and 5 is shown and described as defining the third band 66. Specifically, the arcuate shield 54 of FIGS. 4 and 5 may be one of the four arcuate shields positioned at the outboard side 76 of the compactor wheel 12.

The inner section 86, which defines a portion of the recessed area 65, includes a toothed edge 88 defining a portion of the openings 70 of FIG. 3. Specifically, the toothed edge 88 may be shaped such that when opposing (i.e., inboard and outboard) arcuate shields 54 are properly positioned, the openings 70 or, more specifically, recessed portions 89, surround, and possibly contact, the center row 72 of compactor wheel tips 32. Further, according to the exemplary embodiment, the inner surface 82 of the arcuate shield 54, as shown in FIG. 5, at the second band 64 (half of which is defined by one arcuate shield 54) defines a substantially continuous surface 90 for engaging the wheel surface 30. For example, the second band 64 of each arcuate shield 54 may have an inner surface contour corresponding to the cylindrical wheel surface 30. As such, the arcuate shields 54 may contact the wheel surface 30 with the continuous surface 90.

As shown in FIG. 5, the outer section 84 of each of the arcuate shields 54 includes an edge 92 having an inwardly projecting mounting flange 94 that is positioned over an edge 44 of the wheel surface 30 (FIG. 2) in the coupled configuration. Specifically, the inwardly projecting mounting flange 94 may be shaped to engage the edge 44 of the wheel surface 30 in the coupled configuration of the arcuate shields 54. The compactor wheel assembly 50 may also include a plurality of load transferring springs 96 having first ends 98 attached to the inner surface 82 of the wrapper 56 at the first or third bands 60 or 66 and second ends 100 in contact with the wheel surface 30. The load transferring springs 96, or other similar devices, may transfer a portion of the load affecting the roading protection system 52 to the wheel surface 30.

Each of the fasteners 58, introduced above, may include a lug 110 having an aperture 112 that receives a threaded fastener, such as a bolt 114. The bolt 114 may cooperate with a nut 116 to secure the arcuate shields 54 in the coupled configuration. Specifically, lugs 110, which may be welded or otherwise attached to the arcuate shields 54, may be positioned, as shown in FIGS. 3-5, near edges 92 of the outer sections 84 at ends thereof, such as ends 118 and 120, such that the threaded fastener 114 may be inserted through aligned openings 112 of lugs 110 of adjacent arcuate shields 54. Lugs 110 are also positioned near toothed edges 88 of the inner sections 86 at positions selected to align with corresponding lugs 110 of an adjacent arcuate shield 54. At least one of the threaded fastener 114 and nut 116 may be rotatable to tighten the fastener 58 and draw the arcuate shields 54 toward one another. Specifically, fasteners 58 positioned near toothed edges 88 may be used to draw inboard and outboard arcuate shields 54 together axially, while fasteners positioned near edges 92 may be used to draw adjacent inboard shields 54 and adjacent outboard shields 54 together circumferentially.

INDUSTRIAL APPLICABILITY

The present disclosure may be applicable to compactor wheels having wheel tips, or teeth, supported about a cylindrical wheel surface. Further, the present disclosure may be particularly applicable to compactors having wheels with wheel tips, wherein the compactor may need to be operated over a paved or surfaced road. Yet further, the present disclosure may be applicable to a system for protecting the compactor wheel tips and the road when the compactor is moved across the relatively hard roadway.

Referring generally to FIGS. 1-5, a compactor 10 may be used at a job site, such as a landfill or a construction site, to compact materials, and may generally include compactor wheels 12, or other similar ground engaging components, such as rollers, having compactor wheel tips 14, or teeth. The compactor wheels 12 may be used to crush materials, such as, for example, waste or soil, as the compactor 10 is moved throughout the job site. While surfaces of the compactor wheel tips 14, during normal operation of the compactor 10, are subject to wear, moving the compactor 10 along paved or surfaced roads may subject the wheel tips to excessive wear and/or damage. As should be appreciated, the compactor 10 may need to operate along surfaced roads when traveling between job sites or when relocating to a customer site or maintenance site.

The roading protection system, or compactor wheel shield assembly, 52, described herein, which includes a plurality of arcuate shields 54, may be used to protect the compactor wheel tips 14 and the roadways while operating the compactor 10 on a surfaced road. Specifically, the plurality of arcuate shields 54 may be positioned in a coupled configuration, shown in FIG. 3, about the substantially cylindrical wheel surface 30 to form a substantially cylindrical wrapper 56. This includes positioning recessed portions 89 of the toothed inner edge 88 of each of the plurality of arcuate shields 54 around portions of a center row 72 of the compactor wheel tips 32. In addition, inwardly projecting mounting flanges 94 of an outer edge 92 of each of the plurality of arcuate shields 54 are positioned over an edge 44 of the wheel surface 30. Since the arcuate shields 54 of the exemplary embodiment are identical, each of the arcuate shields 54 may be used interchangeably. Further, the identical arcuate shields 54 may be shaped such that they may be nested when stowed.

The coupled configuration may be secured by fastening the plurality of arcuate shields 54 exclusively to one another. For example, fasteners 58, as described above, may be positioned to draw the arcuate shields 54 together both axially and circumferentially. The fasteners 58, attached only to the arcuate shields 54, are positioned at the edges 92 and within the recessed area 65 such as to minimize contact with the ground during rotation of the wheel 12. Further, although alternative fastening means may be utilized, it may be preferable to utilize a fastening means that does not require modification of the wheel surface 30. For example, additional components attached to the wheel surface 30 may be damaged during normal compactor operation.

After the coupled configuration is secured, the wrapper 56 may provide at least one continuous surface for engaging the ground, such as along first and third bands 60 and 66, which may protect the compactor wheel tips 32 and the road during compactor operation. A continuous surface 90 for engaging the wheel surface 30, along the second band 64, is also provided, and includes openings 70 positioned around the center row 72 of the wheel tips 32. The engagement of the openings 70 with the center row 72 of wheel tips 32 may reduce slippage of the roading protection system 52 during operation of the compactor 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A compactor wheel assembly, comprising:
   a substantially cylindrical wheel surface having a plurality of compactor wheel tips extending radially therefrom, wherein the wheel surface and the compactor wheel tips define an overall diameter; and
   a plurality of arcuate shields coupled with the wheel surface and defining a substantially cylindrical wrapper around the wheel surface;
   wherein the wrapper includes first and second bands, the first band having a diameter greater than the overall diameter and defining a substantially continuous surface for engaging the ground, and the second band having a diameter less than the overall diameter and defining a substantially continuous surface for engaging the wheel surface; and
   the first band being offset from the second band such that the first band and the second band cover mutually exclusive portions of the wheel surface.

2. The compactor wheel assembly of claim 1, wherein the wrapper includes a third band having a diameter greater than the overall diameter and defining another substantially continuous surface for engaging the ground, wherein the first and third bands are on opposing sides of the second band.

3. The compactor wheel assembly of claim 2, wherein the second band includes openings for receiving a subset of the compactor wheel tips therethrough.

4. The compactor wheel assembly of claim 2, further including a plurality of load transferring springs having first ends attached to inner surfaces of the wrapper at the first or third bands and second ends in contact with the wheel surface.

5. The compactor wheel assembly of claim 3, wherein exactly eight arcuate shields define the wrapper.

6. The compactor wheel assembly of claim 5, wherein each of the arcuate shields includes an outer section defining a portion of the first or third bands and an inner section defining a portion of the second band, wherein the inner section includes a toothed edge defining a portion of the openings.

7. The compactor wheel assembly of claim 6, wherein the outer section of each of the arcuate shields includes an edge having an inwardly projecting mounting flange that is positioned over an edge of the wheel surface.

8. The compactor wheel assembly of claim 7, wherein the eight arcuate shields are identical.

9. A compactor, including
   a frame;
   an internal combustion engine supported on the frame;
   a plurality of compactor wheel assemblies coupled through a drivetrain with the internal combustion engine, each of the plurality of compactor wheel assemblies including:
   a substantially cylindrical wheel surface having a plurality of compactor wheel tips extending radially therefrom, wherein the wheel surface and the compactor wheel tips define an overall diameter; and
   a plurality of arcuate shields coupled with the wheel surface and defining a substantially cylindrical wrapper around the wheel surface;
   wherein the wrapper includes first and second bands, the first band having a diameter greater than the overall diameter and defining a substantially continuous surface for engaging the ground, and the second band having a diameter less than the overall diameter and defining a substantially continuous surface for engaging the wheel surface; and the first band being offset from the second band such that the first band and the second band cover mutually exclusive portions of the wheel surface.

10. The compactor of claim 9, wherein the wrapper includes a third band having a diameter greater than the overall diameter and defining another substantially continuous surface for engaging the ground, wherein the first and third bands are on opposing sides of the second band.

11. The compactor of claim 10, wherein the second band includes openings for receiving a subset of the compactor wheel tips therethrough.

12. The compactor of claim 10, further including a plurality of load transferring springs having first ends attached to inner surfaces of the wrapper at the first or third bands and second ends in contact with the wheel surface.

13. The compactor of claim 11, wherein exactly eight arcuate shields define the wrapper.

14. The compactor of claim 13, wherein each of the arcuate shields includes an outer section defining a portion of the first or third bands and an inner section defining a portion of the second band, wherein the inner section includes a toothed edge defining a portion of the openings.

15. The compactor of claim 14, wherein the outer section of each of the arcuate shields includes an edge having an inwardly projecting mounting flange that is positioned over an edge of the wheel surface.

16. The compactor of claim 15, wherein the eight arcuate shields are identical.

17. A compactor wheel shield assembly, comprising: a plurality of arcuate shields configured to be coupled with a substantially cylindrical wheel surface and to define a substantially cylindrical wrapper around the wheel surface, the wrapper including first and second bands;
   the first band having a diameter greater than an overall diameter defined by the wheel surface and a plurality of compactor wheel tips extending radially therefrom, and defining a substantially continuous surface for engaging the ground;
   the second band having a diameter less than the overall diameter and defining a substantially continuous surface for engaging the wheel surface; and
   the first band being offset from the second band such that the first band and the second band cover mutually exclusive portions of the wheel surface.

18. The compactor wheel shield assembly of claim 17, wherein the wrapper includes a third band having a diameter greater than the overall diameter and defining another substantially continuous surface for engaging the ground, wherein the first and third bands are on opposing sides of the second band.

19. The compactor wheel shield assembly of claim 18, wherein the second band includes openings for receiving a subset of the compactor wheel tips therethrough.

20. The compactor wheel shield assembly of claim 19, further including a plurality of load transferring springs having first ends attached to inner surfaces of the wrapper at the first or third bands and second ends in contact with the wheel surface.

* * * * *